Jan. 28, 1941.  C. H. MATTHIESSEN, JR  2,229,896
APPARATUS FOR TOPPING FRUIT
Filed April 29, 1939  4 Sheets-Sheet 1
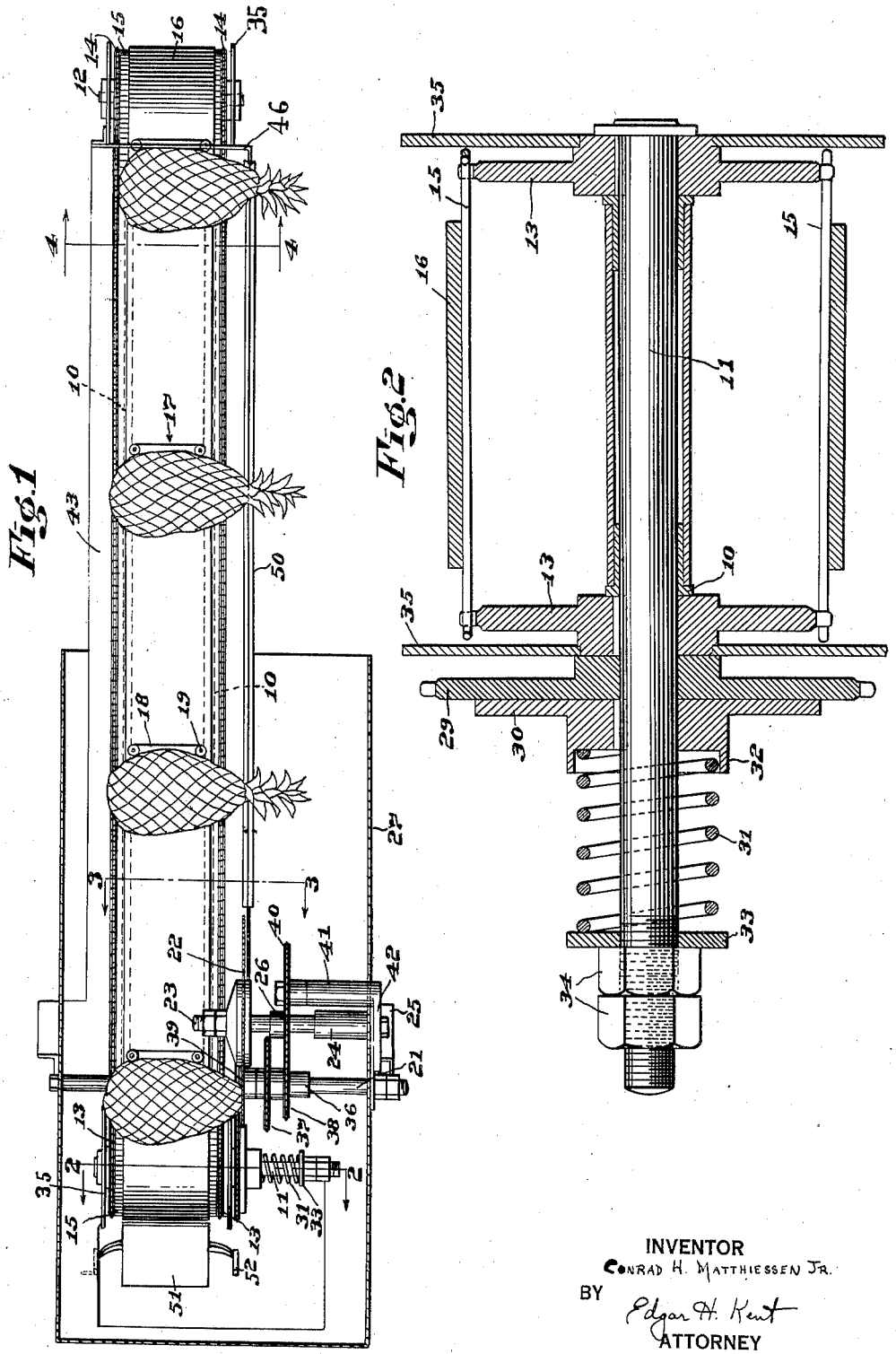
INVENTOR
Conrad H. Matthiessen Jr.
BY Edgar H. Kent
ATTORNEY Jan. 28, 1941.  C. H. MATTHIESSEN, JR  2,229,896
APPARATUS FOR TOPPING FRUIT
Filed April 29, 1939  4 Sheets-Sheet 2
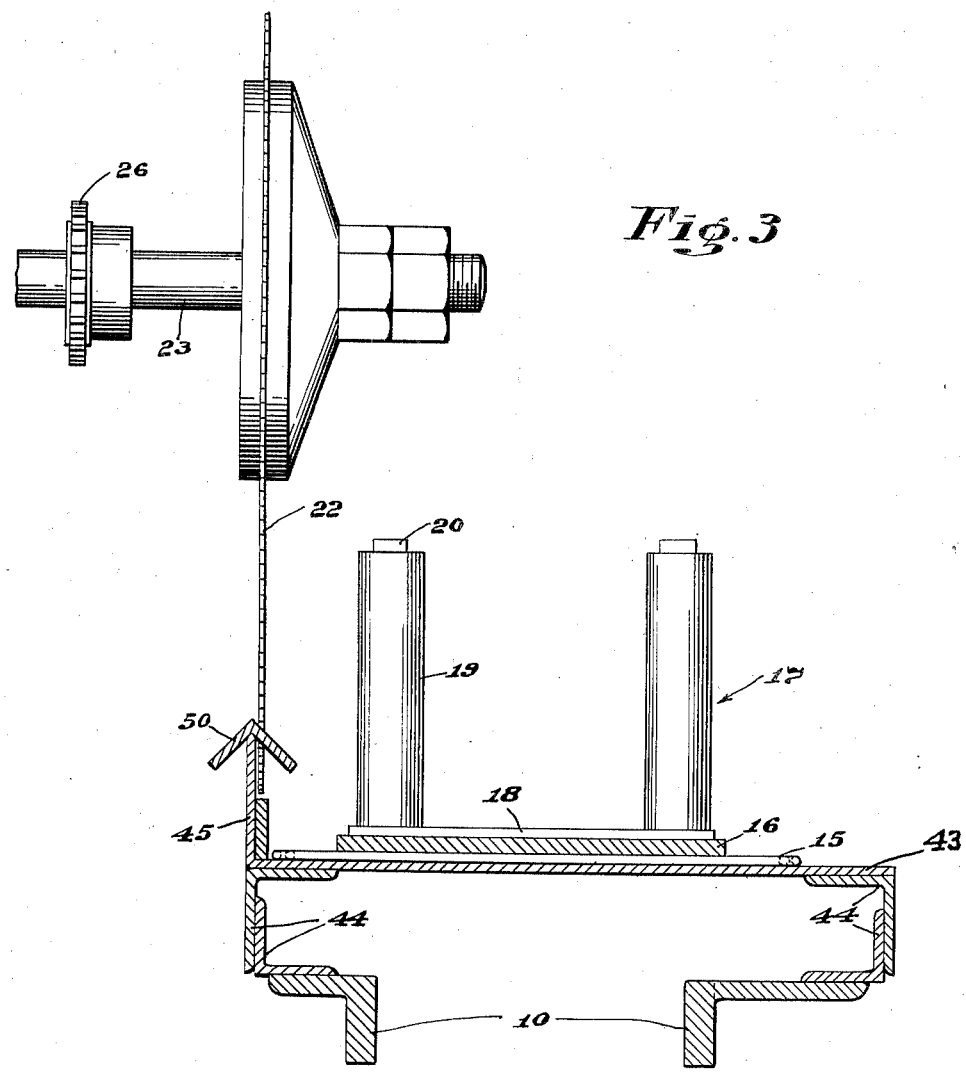
INVENTOR
CONRAD H. MATTHIESSEN JR.
BY
Edgar H. Kent
ATTORNEY

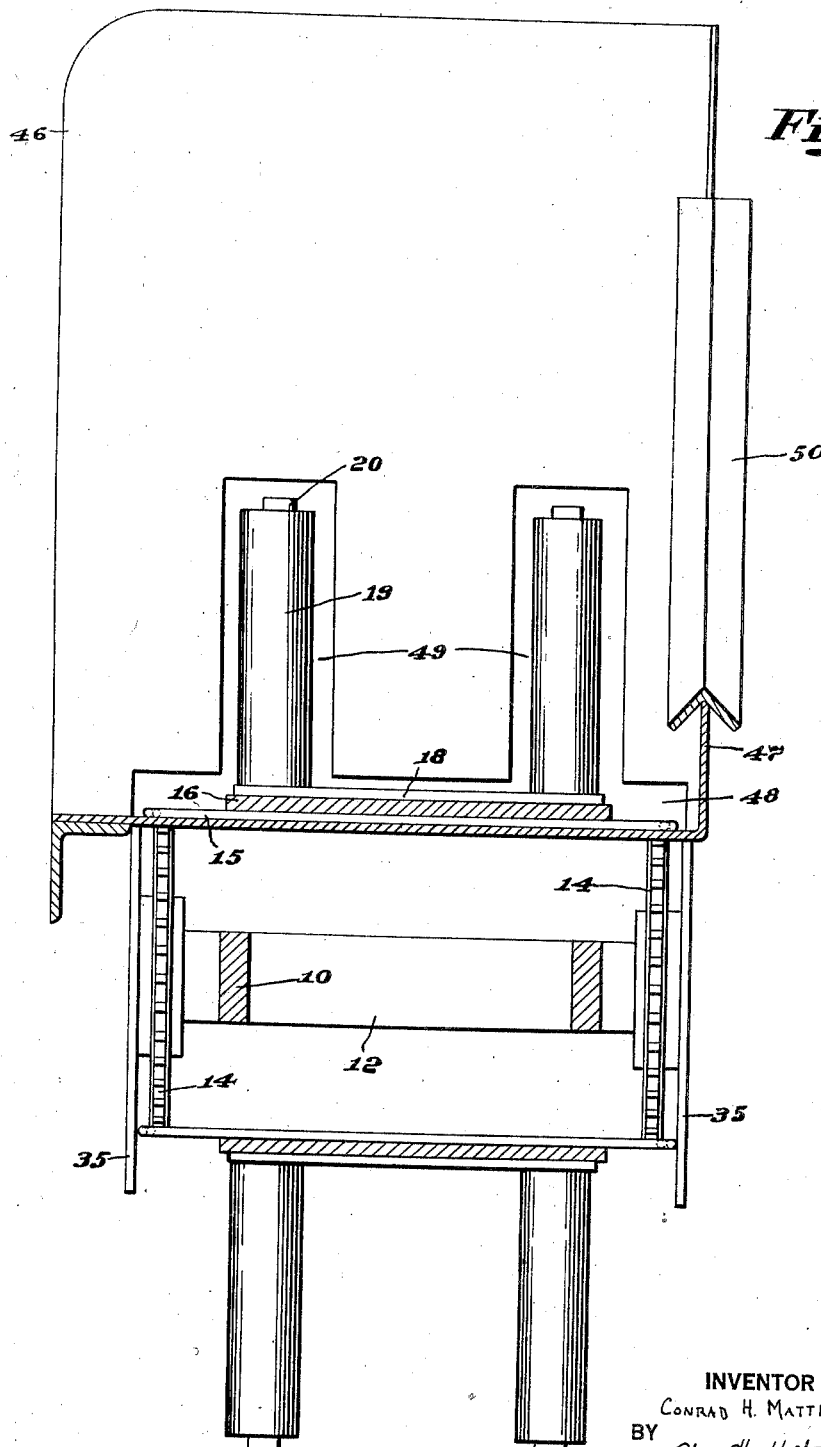

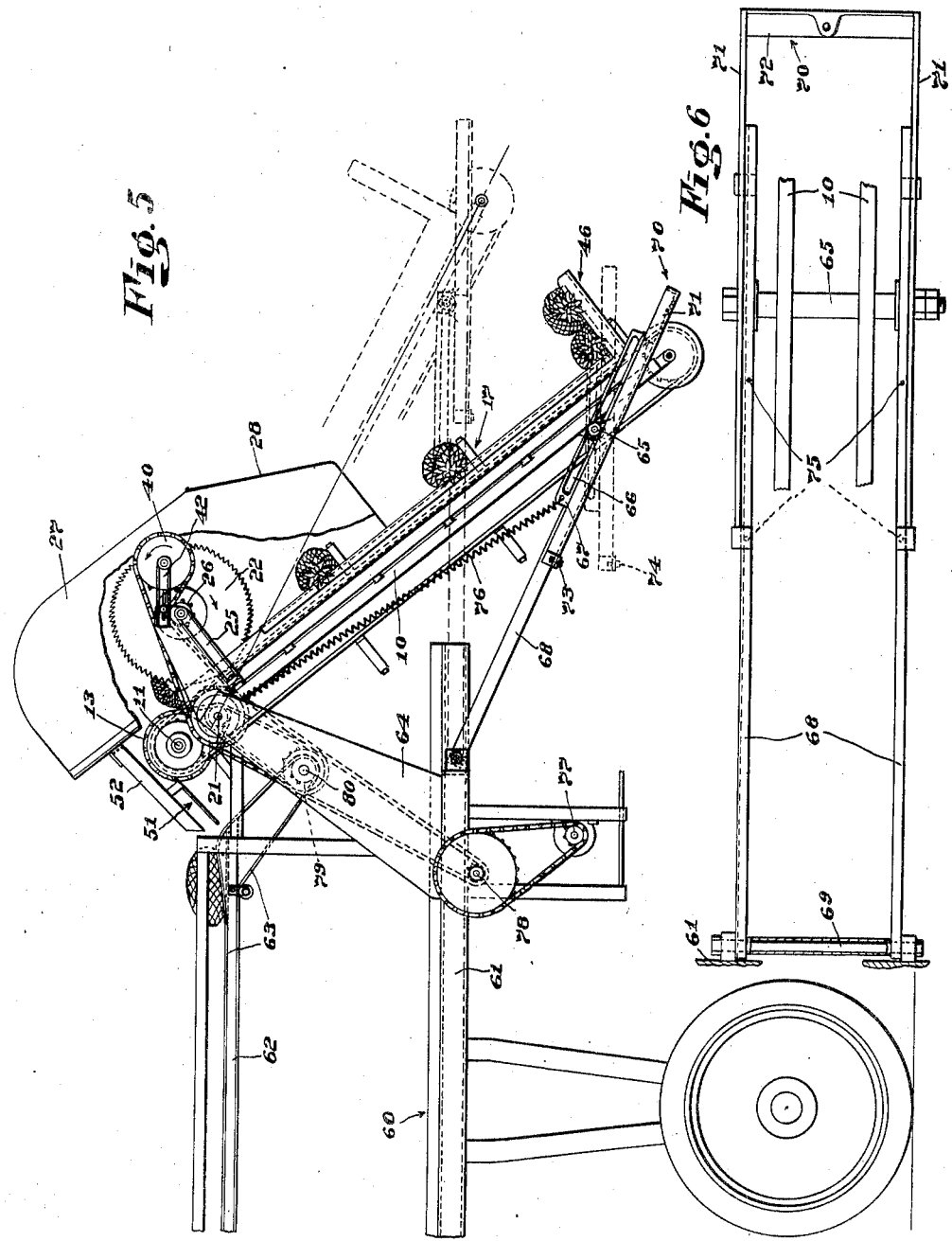

Patented Jan. 28, 1941

2,229,896

UNITED STATES PATENT OFFICE 2,229,896

APPARATUS FOR TOPPING FRUIT

Conrad H. Matthiessen, Jr., Pasadena, Calif., assignor to Hawaiian Pineapple Company, Limited, Honolulu, Territory of Hawaii, a corporation of Hawaii Application April 29, 1939, Serial No. 270,769

14 Claims. (Cl. 146—6)

The present invention relates to apparatus for treating fruit or vegetables and more particularly to topping or decrowning apparatus. The apparatus of the invention is intended primarily for the treatment of pineapples and will be described with reference thereto.

In the harvesting of pineapples, it is desirable that the leafy tops or crowns be removed in the fields and this has heretofore been done by workers who cut the crowns from the pineapples with a hand knife after they are picked. This practice is time consuming, results in lack of uniformity in decrowning, and is productive of injuries to the workers and to the pineapples.

It is an object of the invention to provide apparatus of the character referred to whereby pineapples may be automatically decrowned with substantial uniformity. It is a further object of the invention to provide such apparatus so designed and arranged that it may be attached to a carriage capable of being driven through fields of mature pineapple plants, such as the tractor disclosed in my co-pending application, Ser. No. 216,522, filed June 29, 1938, so that the decrowning may be carried out in conjunction with the picking. Additional objects of the invention are to provide such apparatus, which, in addition to decrowning, may also function as a convenient loader for a carriage of the type referred to, and to which the workers may readily feed the pineapples as they are picked without danger of accidental injurious contact with the cutting mechanism.

Other objects and advantages of the invention will be apparent from the ensuing more particular description and from the accompanying drawings, in which:

Fig. 1 is a top plan view, with parts broken away, of decrowning apparatus of the invention;

Fig. 2 is a vertical section on the line 2—2 of Fig. 1 looking in the direction of the arrows;

Fig. 3 is a vertical section on the line 3—3 of Fig. 1 looking in the direction of the arrows;

Fig. 4 is a vertical section on the line 4—4 of Fig. 1 looking in the direction of the arrows;

Fig. 5 is a side view, with parts broken away, of decrowning apparatus as in Fig. 1 attached to the rear of a carriage for use as a combined decrowner and loader, illustrating supporting framework and drive connections suitable for such attachment; and Fig. 6 is a bottom plan view of the adjustable supporting framework shown in Fig. 5, for the lower end of the decrowner.

Referring now to the accompanying drawings, and first to the decrowning apparatus best shown in Figs. 1 to 3, an elongated frame 10 has rotatably mounted at opposite ends thereof driven shaft 11 and idler shaft 12 carrying, respectively, pairs of sprocket wheels 13 and 14 for operating an endless conveyor chain belt 15 which may have a canvas facing 16. Secured to the outer face of the belt 15 at regularly spaced intervals, are conveyor forks 17, comprising cleats 18 attached to the belt transversely thereof and vertically extending fingers 19 preferably of rubber or other yieldable material secured to the cleats 18 as by studs 20.

The frame 10 may be mounted on any suitable supporting structure, such as the carriage shown in Fig. 5, with the end containing the shaft 11 above the opposite end so that the belt 15 travels in an inclined path between the sprocket wheels 13 and 14, an incline of about 45 degrees being satisfactory for operating purposes. The frame 10 is preferably pivotally connected to the supporting structure, particularly where the supporting structure is a carriage operating in the fields, so that the inclination of the frame may be adjusted. For this purpose, there is shown in Figs. 1 and 5 pivot pin 21 fixed at its ends to the supporting structure on which pin the frame 10 is pivotally mounted adjacent the shaft 11, the pin 21 extending between the upper and lower stretches of the belt 15. Suitable mechanism for adjusting the position of the frame 10 about the pivot pin 21 is shown in Fig. 5 and will be hereinafter described.

Mounted to operate at one side of the belt 15 in a vertical plane parallel to and removed to the outside from the vertical plane through the adjacent side of the belt 15 is a circular saw 22, the axis of which is located above the surface plane of the upper stretch of the belt 15 a distance slightly less than the radius of the saw, for a purpose to be hereinafter detailed. As shown in Figs. 1 and 5, saw 22 may be fixed at one end of a stub shaft 23 extending parallel to the shaft 11 and rotatably journaled in a sleeve 24 on the upwardly extending arm of a bracket 25 fixed to the frame 10. Shaft 23 may be rotated to operate the saw by means of a sprocket wheel 26 fixed on the shaft between the saw and the sleeve 24 and having sprocket chain drive connection for rotation of the shaft 23 and saw 22 in the clockwise direction as viewed in Fig. 5. An open-ended, elongated casing 27 on the upper end of the frame 10 over the saw and adjacent operating parts and belt portion forms a protective housing through which the pineapples are carried by the belt 15 and within which the decrowning is performed. The lower end of the casing 27 may be provided with a grating 28.

As best shown in Fig. 2, there is rotatably mounted on the shaft 11, outwardly of one of the sprocket wheels 13, a sprocket disc 29 having normal driving connection with the shaft 11 through a clutch disc 30 keyed to the shaft 11. Clutch disc 30 is pressed into frictional engagement with a face of the sprocket disc 29 by means of a spring 31 surrounding the shaft 11, having one end seated in a sleeve 32 on the disc 30 and bearing at the other end against a disc 33 slidable on the shaft 11 and adjustable longitudinally thereof to vary the compression of the spring on the clutch disc by means of lock nuts 34 having screw threaded engagement with the adjacent end of the shaft 11. The disc 29 has sprocket chain drive connection for rotation in the opposite direction to that of rotation of the saw 22. Guard discs 35 may be provided on the hubs of the sprocket wheels 13 and 14 beyond the sides of the belt 15, as shown in Figs. 1 and 2.

When, as is contemplated in the drawings, the frame 10 is pivotally mounted on its supporting structure and with reference to the source of power, driving connections to the saw and belt should be through the pivot line of the frame. For this purpose I mount rotatably on the pivot pin 21 a sleeve 36 having secured thereto sprocket wheels 37, 38 and 39. Sprocket wheel 37 is connected by sprocket chain to the main power shaft, while sprocket wheels 38 and 39 are connected by sprocket chains respectively to sprocket wheel 26 which operates the saw and sprocket disc 29 which operates the conveyor belt. To enable drive of the sprocket wheel 26 in the opposite direction from that of the sleeve 36 and disc 29, I provide above and in vertical alignment with the wheel 26 an idler sprocket wheel 40 rotatable on a stub shaft 41 fixed to an arm 42 adjustably mounted on the bracket 25. As shown in Fig. 5, the sprocket chain connecting the sprocket wheels 26 and 38 is passed over, but not around, the wheel 26 sufficiently for driving engagement and thence around the idler sprocket wheel 40.

A supporting chute 43 for the upper stretch of the belt 15 is mounted on the frame 10 by means of angle irons 44 and is provided at the saw side of the belt 15 with a vertical flange 45 extending from adjacent the saw 22 to the lower end of the chute 43. Attached to or formed integral with the lower end of the chute 43, just forwardly of the sprockets 14, is an upstanding slide 46 provided at the side with an extension 47 of the flange 45. Slide 46 constitutes a feed chute on which the pineapples are positioned by a worker and is shown as projecting at substantially a right angle to the chute 43 so that when the frame 10 and chute 43 are in operative position at an incline of about 45 degrees, the slide 46 is similarly inclined in the opposite direction.

As shown in Fig. 4, slide 46 is provided at its base between its sides with a longitudinal slot 48 and communicating vertical slots 49 affording passage through the slide for the belt 15 and attached conveyor forks 17. Upon the flange 45 and extension 47 is secured a guide rail 50 in the form of an inverted angle iron, said rail extending the full length of the flange 45 and extension 47 and, as shown in Figs. 1 and 3, having its apex substantially in the plane of the saw 22 for a purpose to be hereinafter described.

A chute 51 may be provided adjacent the top end of the conveyor into which the decrowned pineapples are discharged by the conveyor. Said chute is provided with side rails 52 by which it may conveniently be hinged to the casing 27, as shown in Fig. 5.

In operation, workers position the pineapples on the slide 46 with their crowns projecting beyond the guide rail, as indicated in Figs. 1 and 5. Two or more pineapples may be superposed on the slide as shown. The lowermost pineapple on the slide is removed at regular intervals by a conveyor fork 17 on the belt 15 passing through the slots 48 and 49 in the slide to contact the back of the pineapple and acting to hold the pineapple in substantially fixed position on the belt until it reaches the top of the incline where it is discharged into chute 51 and thence to a suitable receiving platform or receptacle. As each pineapple is carried by the belt beyond the upper end of the guard rail 50, it comes in contact with the saw 22 which removes the projecting crown by a vertical cut approximately through the point of contact of the crown with the guide rail. It will thus be seen that by positioning the pineapples on the slide 46 uniformly as regards the point of contact of the guide rail 50 with the base of the crown, uniformity in decrowning is obtained.

The direction of rotation of the saw 22 is such as to cut downwardly through the crowns. Thus any pressure exerted on the pineapple by the saw is in a downward direction and acts to force the pineapple against the belt and conveyor forks, rather than to raise it away from the belt and forks as would be the case if the cut were in the opposite direction. In most cases the resistance of the crown to the cutting action of the saw is slight and the force exerted by the saw on the pineapple correspondingly slight. However, pineapple crowns vary considerably in size and toughness and in the case of large tough crowns, the resistance to cutting may be so great that the downward force exerted by the saw on the crown would be sufficient to twist the pineapple on the belt or drag it off the belt if the upward force exerted on the pineapple by the belt 15 and conveyor forks 17 was not temporarily checked. It is primarily for this reason that I provide the above described spring clutch drive for the belt 15. Normally, the pressure of the spring 31 against the clutch disc 30 is sufficient to maintain the disc 30 in constant driving engagement with the driving sprocket disc 29. But when there is an excessive drag on the belt, such as that due to the resistance of a tough pineapple crown to the cutting action of the saw, the pressure of the spring 31 is overcome, the clutch slips and the motion of the belt is temporarily halted until the drag is released, as by completion of the cut. By adjustment of the disc 33, the pressure of the spring 31 may be regulated so that it will be overcome by a drag slightly less than that of the saw, acting on a resistant crown, sufficient to disturb the position of the pineapple on the belt.

The drag required to cause slippage of the clutch is small enough so that a worker can stop the belt with his hand, and thus, in case his hand became caught in the belt, prevent its being carried into contact with the saw. The clutch thus also functions as a safety device.

In Fig. 5, decrowning apparatus of the invention is shown attached to a carriage which may be driven through the fields, so that the pineapples may be placed in the decrowner as they are picked and automatically decrowned and loaded onto the carriage, as is generally desirable.

The carriage 60, shown in part in Fig. 5, is a tractor such as that disclosed in my co-pending application mentioned above, capable of operation in fields of grown pineapple plants without damage to the plants and having a high clearance main frame 61 to the rear end of which the decrowning mechanism is attached. Secured to the frame 61 and raised above it, is a horizontal guideway 62 for an endless belt 63 on which the decrowned pineapples are deposited by the conveyor and which carries them forward to workers on the carriage who pack the pineapples into lug boxes. Frame 61 is also provided with spaced vertical extensions 64 between which the upper end of the frame 10 of the decrowner apparatus is supported, the decrowning apparatus being the same as that shown in Figs. 1 to 4 and heretofore described except as hereinafter noted.

The decrowning apparatus could, of course, be immovably fixed to the carriage frame at the desired inclination for operating purposes. It is desirable, however, that the decrowner be pivoted between and maintainable in an operative position with its lower end adjacent the ground and an inoperative position with its lower end raised into approximate alignment with the carriage frame. To this end I provide the decrowner frame 10 with the pivot pin mounting connection 21 shown in Fig. 1 and previously described, which is rigidly connected at its ends to the vertical extensions 64 of the carriage frame to pivotally support the upper end of the decrowner apparatus on the carriage, and I also provide novel means, shown in Figs. 5 and 6 and now to be described, for locking the decrowner in a lowered operative position or a raised inoperative position and for readily shifting the decrowner between said positions.

Fixed to the lower end of the decrowner frame 10 and projecting outwardly of the sides of the frame is a pin 65 slidably received adjacent its outer ends in the longitudinally extending slots 66 provided in vertical extensions 67 of a pair of parallel frame arms 68, said arms spaced laterally a sufficient distance to accommodate the frame 10 and conveyor belt 15 between them, and adapted to be pivotally connected at one end to the rear of the carriage frame 61, as by the pivot pin 69. Pivotally secured to the outer ends of the pin 65, beyond the frame arms 68, is a U frame 70 having side arms 71 extending beside and parallel to the arms 68 inwardly part way toward the carriage frame 61 and outwardly to a connecting crosspiece or operating handle 72 beyond the outer ends of the arms 68. At the inner ends of each side 71 of the frame 70 is secured a bracket 73 having an inwardly extending arm to which is secured a pin 74 projecting vertically therefrom under the adjacent frame arm 68. At suitably spaced locations in the under sides of the frame arms 68 are apertures 75 adapted to receive and grip the pins 74 projected upwardly therein by downward pressure on the handle 72. Since the frame arms 68 and the decrowner frame 10 are pivoted on different axes, in order to pivot the decrowner frame 10 about its pivot pin 21, it is necessary that the pin 65 connecting the frame 10 and frame arms 68 slide longitudinally in the slots 66 to permit relative lateral movement of the frame 10 and arms 68. Moreover, since the frame 70 is pivotally but not slidably connected to the pin 65, in order that the pin 65 may slide in the slots 66 it is necessary that the frame 70 slide longitudinally of the frame arms 68. It will therefore be apparent that when the pins 74 are engaged in the apertures 75 and the frame 70 is thus locked against lateral shifting relative to the arms 68, the decrowner frame 10 is effectively locked against pivot motion about the pin 21. It will also be apparent that by disengaging the pins 74 from the apertures 75 and sliding the frame 70 relatively to the arms 68, the decrowner frame 10 may be pivoted about its axis to a new position, as indicated by dotted lines in Fig. 5. Springs 76 connected at one end to the pivot pin 21 and at the other to the arms 68 adjacent the slots 66 facilitate raising of the frame. In the drawings I have shown two sets of apertures 75 corresponding to a lowered operative position of the decrowner shown in full lines in Fig. 5 and a raised substantially horizontal inoperative position shown in dotted lines in Fig. 5. Other apertures 75 may, of course, be provided in the arms 68 for locking the frame 10 at different inclinations from those shown.

For operating the decrowner there is supported below the rear end of the carriage frame 61 a suitable motor (not shown) having a drive shaft 77 connected by sprocket wheel and chain with a drive shaft 78 on the frame 61 which in turn has sprocket wheel and chain connection with the sprocket wheel 37 on the sleeve 36 on pin 21, from which sleeve the conveyor belt and saw operating mechanisms are driven, as previously explained. The shaft 78 may also have sprocket and chain driving connection with an operating roller 79 for the belt 63, said roller being rotatable on a shaft 80 secured to the frame extensions 64, or said roller 79 may be driven by sprocket and chain connection to the sleeve 36 as indicated in Fig. 5.

In use, the carriage 60 may be driven through the fields with frame 10 in lowered position so that the slide 46 is readily accessible to the workers. The pineapples may then be placed, as they are picked, on the slide 46 from which they are removed by the conveyor belt 15 and conveyor forks 17 to be automatically decrowned and loaded onto the belt 63 on the carriage 60 as previously described. In order that the pineapples may be positioned on the belt 63 at right angles to their position on the conveyor belt 15, as is desirable for subsequent handling, the belt 63 may be tilted upward at one side where it passes under the chute 51.

While I have shown only a single decrowner attached to the carriage, it will be obvious that more may be employed if desired. It will also be apparent that various changes may be made in the embodiments of the invention shown in the drawings and described herein, without departing from the spirit and scope of the invention.

I claim:

1. In apparatus for topping fruit such as pineapples, an endless conveyor having fruit carrier members, cutting means adjacent the conveyor, means for operating the conveyor to subject the fruit engaged by the carrying means to topping by the cutting means, and control means responsive to the opposed pressure of said conveyor and said cutter on the fruit to prevent said pressure from exceeding a predetermined operating maximum.

2. In apparatus for topping fruit such as pineapples, an endless conveyor having fruit carrier members, cutting means adjacent the conveyor, means for operating the conveyor to subject the fruit engaged by the carrying means to topping by the cutting means, and means to render the conveyor inactive while the pressure of the cutter on a fruit exceeds a predetermined operating maximum.

3. In apparatus for topping fruit such as pineapples, an endless conveyor having fruit carrier members, cutting means adjacent the conveyor, means for actuating the conveyor to subject a fruit engaged by the carrying members to topping by the cutting means, clutch means connecting said actuating means to the conveyor and adjustable compression means to maintain said clutch in normal operative engagement while permitting said clutch to slip to disconnect the conveyor from the actuating means while the pressure of the cutter on a fruit exceeds a predetermined operating maximum.

4. In apparatus for topping fruit such as pineapples, an endless conveyor, cutting means having a cutting edge adjacent a side of the conveyor and opposed to the direction of travel thereof, fruit carrier members projecting from a surface of the conveyor, a feed chute for maintaining a supply of fruit successively slidable to a feeding position accessible to the carrier members, means for operating the conveyor to engage said carrier members successively with fruit in said chute and to subject said fruit to topping by said cutting means, and means to render the conveyor inactive while the pressure of the cutter on a fruit exceeds a predetermined operating maximum.

5. As a loading elevator for a harvester carriage, apparatus for decrowning pineapples comprising an elongated frame, means mounting the frame on the carriage to extend outwardly thereof, an endless conveyor mounted on the frame to operate longitudinally thereof and having fruit carrier members, feeding means adjacent the outer end of the frame for supplying the fruit to the carrier members on the conveyor, cutting means having a cutting edge adjacent a side of the conveyor, means for operating the conveyor to receive fruit from the feeding means, to subject it to decrowning by the cutting means and to deposit the decrowned fruit on the carriage, and control means responsive to the opposed pressure of said conveyor and said cutter on the fruit to prevent said pressure from exceeding a predetermined operating maximum.

6. Apparatus for decrowning pineapples comprising an endless conveyor having fruit holding means, cutting means adjacent the conveyor, means for operating the conveyor to subject a fruit in the holding means to decrowning by the cutting means, feeding means for supplying the fruit to the holding means on the conveyor, and gauge means to enable placement of fruit in said feeding means for transfer thereby to said holding means in position for topping by the cutting means uniformly at the base of their crowns.

7. Apparatus for decrowning pineapples comprising an endless conveyor having fruit holding means, cutting means adjacent the conveyor, means for operating the conveyor to subject a fruit in the holding means to decrowning by the cutting means, feeding means for supplying the fruit to the holding means on the conveyor, and guide means engageable with the crown base of fruit placed in said feeding means to enable placement of fruit in said feeding means in position for transfer thereby to said holding means with the base of their crowns in uniform alignment with the cutting edge of said cutting means.

8. Apparatus for topping fruit such as pineapples comprising an endless conveyor, cutting means having a cutting edge adjacent a side of the conveyor and opposed to the direction of travel thereof, fruit carrier members on the conveyor for retaining a fruit thereon positioned with its top projecting at said side of the conveyor beyond the plane of the cutting edge of said cutting means, a feed chute for maintaining a supply of the fruit successively slidable to a feeding position accessible to the carrier members, and guide means to enable positioning of the fruit on the feed chute with the base of their crowns in uniform alignment with the cutting edge of said cutter.

9. In apparatus for topping fruit such as pineapples, an endless conveyor, cutting means having a cutting edge adjacent a side of the conveyor and opposed to the direction of travel thereof, fruit carrier members projecting from a surface of the conveyor, a feed chute for maintaining a supply of fruit successively slidable to a feeding position accessible to the carrier members, and gauge means at one side of said chute to enable positioning of fruit in said chute for transfer to the carrier members in position for topping by the cutting means uniformly at the base of their crowns.

10. In apparatus for topping fruit such as pineapples, an endless conveyor, cutting means having a cutting edge adjacent a side of the conveyor and opposed to the direction of travel thereof, fruit carrier members projecting from a surface of the conveyor, a feed chute for maintaining a supply of fruit successively slidable to a feeding position accessible to the carrier members, and a guide rail at the cutter side of the conveyor and chute having a guiding edge extending from adjacent the outer end of the chute to adjacent the cutter in substantial alignment with the cutting edge of the cutter, said guiding edge adapted to slidably engage the crown base of fruit placed in said chute and carried to said cutting means by the conveyor.

11. As a loading elevator for a harvesting carriage, apparatus for decrowning pineapples, comprising an elongated frame, means mounting the frame on the carriage to extend outwardly thereof, an endless conveyor mounted on the frame to operate longitudinally thereof and having fruit carrier members, cutting means having a cutting edge adjacent a side of the conveyor intermediate its ends, feeding means adjacent the outer end of the frame for supplying the fruit to the holding means on the conveyor, gauge means to enable placement of fruit in said feeding means in position for transfer thereby to said carrier members with the base of their crowns in uniform alignment with the cutting edge of said cutting means, and means for operating the conveyor successively to receive fruit from the feeding means, to subject it to decrowning by the cutting means and to deposit the decrowned fruit on the carriage.

12. As a loading elevator for a harvester carriage, apparatus for topping fruit such as pineapples comprising an elongated frame, an endless conveyor mounted on the frame to operate longitudinally thereof and having fruit carrier members, cutting means on said frame having a cutting edge at one side of said conveyor intermediate the ends of said frame, a feed chute at one end of said frame for maintaining a supply of fruit successively slidable to a feeding position accessible to the carrier members, gauge means to enable positioning of the fruit on the feed chute with the base of their crowns in uniform alignment with the cutting edge of said cutter, means adjacent the opposite end of the frame for discharging fruit from the carrier members, means for operating the conveyor in a direction to carry fruit from the feeding means to the discharging means, means mounting the frame on the carriage to extend outwardly thereof and downwardly therefrom with the feed chute adjacent the ground, and means on the carriage to receive fruit discharged from the holding means.

13. Apparatus for decrowning pineapples comprising an endless conveyor having fruit holding means, cutting means adjacent the conveyor, means for operating the conveyor to subject a fruit in the holding means to decrowning by the cutting means, and feeding means for supplying the fruit to the holding means on the conveyor in position for topping by the cutting means uniformly at the base of their crowns, said last named means including a guide rail at the cutter side of the conveyor having a guiding edge substantially aligned with the cutting edge of the cutter and adapted to slidably engage the crown base of fruit as it is fed to the conveyor.

14. Apparatus for decrowning pineapples comprising an endless conveyor having fruit holding means, cutting means adjacent the conveyor, means for operating the conveyor to subject a fruit in the holding means to decrowning by the cutting means, feeding means for supplying the fruit to the holding means on the conveyor, and gauge means to enable placement of fruit in said feeding means for transfer thereby to said holding means in position for topping by the cutting means uniformly at the base of their crowns, said gauge means comprising a guide rail at the cutter side of the conveyor having a guiding edge adapted to slidably engage the crown base of fruit placed in said feeding means and while carried to said cutting means by the conveyor.

CONRAD H. MATTHIESSEN, Jr.